April 15, 1924.
G. A. PETTIT
1,490,848
FILLER NECK FOR LOCOMOTIVE ROD CUPS
Filed Jan. 24, 1923
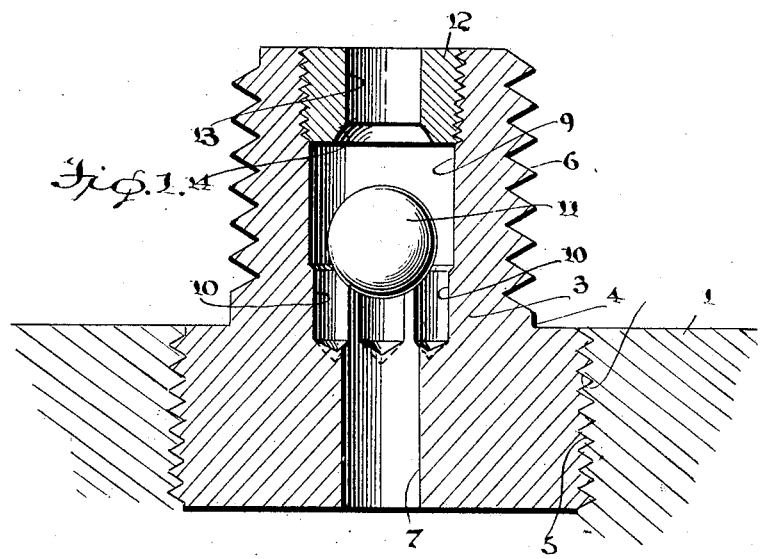
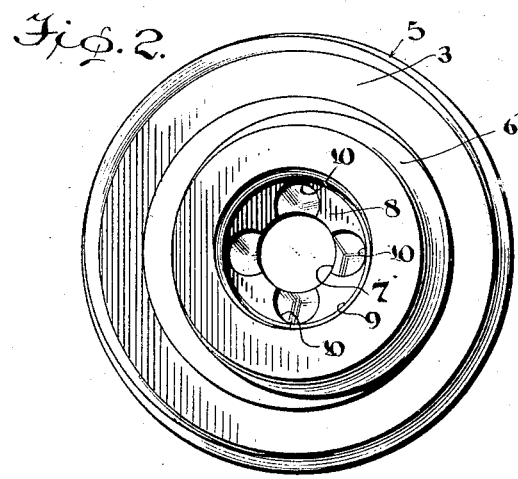
WITNESSES
R. E. Rousseau
INVENTOR
G. A. Pettit,
BY
ATTORNEYS Patented Apr. 15, 1924.

1,490,848

UNITED STATES PATENT OFFICE.

GEORGE A. PETTIT, OF NEW ORLEANS, LOUISIANA.

FILLER NECK FOR LOCOMOTIVE ROD CUPS.

Application filed January 24, 1923. Serial No. 614,647.

*To all whom it may concern:*

Be it known that I, GEORGE A. PETTIT, a citizen of the United States, and resident of New Orleans, in the parish of Orleans and State of Louisiana, have invented certain new and useful Improvements in Filler Necks for Locomotive Rod Cups, of which the following is a specification.

My invention is an attachment for locomotive rod cups or like lubricant receptacles, and it consists in the combinations, constructions and arrangements herein described and claimed.

An object of my invention is to provide a device of the character described which is adapted to engage with the inlet to a locomotive rod cup or like lubricant receptacle and to permit of a relatively stiff or heavy lubricant being forced therethrough into the rod cup or like receptacle while preventing return of the lubricant from the rod cup or receptacle therethrough.

A further object of my invention is to provide an attachment of the character described which is extremely simple in construction, capable of being manufactured at a relatively low cost and not likely to get out of order easily in service.

A still further object of my invention is to provide an attachment of the character described which is adapted to connect the discharge nozzle of a lubricant gun or like device to a locomotive rod cup or like lubricant receptacle without any changes being required in the ordinary construction of the lubricant gun or the locomotive rod cup.

Other objects and advantages will be apparent from the following description, and the novel features of the invention will be particularly outlined in the appended claims.

My invention is illustrated in the accompanying drawings, forming a part of this application, in which—

Figure 1 is a vertical section through a practical embodiment of the invention and through a fragment of the inlet portion of a receptacle to which applied, and Figure 2 is a top plan view of the device with certain parts comprised therein omitted.

Referring now to the drawings, I show in Figure 1 thereof a fragment of the locomotive rod cup or like lubricant receptacle, which fragment is indicated at 1 and is shown as being provided with a screw threaded inlet orifice or port 2. In carrying out my invention, I provide a body 3 which is reduced externally at 4 to provide a relatively large end portion having external screw threads 5 adapted to engage with the threads of the opening 2, and a diametrically smaller portion which is threaded externally at 6 for connection with the discharge nozzle of a lubricant gun, not shown, or like device. An axial bore 7 extends longitudinally of the body 3 from the outer end of the relatively large portion approximately midway between the ends of the body and is then merged by an annular shoulder 8 into a counter-bore 9 which extends the remainder of the length of the body. A plurality of spaced ducts or grooves 10 of arcuate cross sectional contour extend through the shoulder 8 alongside of the bore 7 in open communication with the latter part of the distance from the shoulder 8 to the outer end of the bore 7. The bottoms of the ducts 10 are inclined from the side edges thereof toward their centers and the bore 7 communicates with the ducts 10 along one side of each duct and along a line adjacent to the longitudinal axial line of the duct. A spherical valve member or ball 11 is diametrically larger than the bore 7 and considerably smaller diametrically than the bore 9. The ducts 10 extend transversely or radially in the shoulder 8 from the bore 7 nearly to the outer edge of the shoulder or the wall of the counter-bore 9, whereby the ducts 10 will be partially open at their upper ends when the ball valve 11 is disposed within the counter-bore 9 and rests centrally thereof or in position to close the bore 7 at the upper end thereof. The shoulder 8 is preferably inclined downwardly toward the inner edge thereof so that the ball valve 11 will move by gravity to central position within the counter-bore when supported upon the shoulder 8.

A screw plug 12 is threadedly fitted into the upper end of the counter-bore 9 above the ball valve 11 and is provided with an axial bore 14 which is substantially equal diametrically to the bore 7 and is beveled or enlarged at its inner end, as indicated at 14 to provide a seat for the ball valve 11 when the latter is moved by pressure from any source from the shoulder 8 against the inner end of the plug 12.

From the foregoing description of the various parts of the device, the operation thereof may be readily understood. The attachment is designed primarily, although not necessarily for application to the rod cups of locomotive engines. The body 3 will be disposed vertically with the smaller portion thereof uppermost and with the relatively large portion thereof fitted into the inlet opening of a rod cup or receptacle as illustrated in Figure 1 and as described. The bore 7 will thus be in open communication with the interior of the rod cup or like receptacle. A lubricant gun is then attached to the smaller portion of the body so that the discharge nozzle of the lubricant gun is in communication with the bore 13 in the plug 12. A lubricant forced into the counterbore 9 will pass around the ball valve 11 through the ducts 10 into the bore 7 and thence into the receptacle to which the attachment is applied. The attachment is designed for use with lubricant receptacles adapted to contain a relatively stiff or heavy lubricant, such as a grease having the consistency of ordinary yellow laundry soap, and when the lubricant has been forced into the bore 7 in the manner described, it will be apparent that the return movement of the lubricant will raise the ball valve 11 from the shoulder 8 and force it against the seat 14, thereby preventing the passage of the lubricant from the receptacle to which the body 3 is attached through the body. While I have shown the smaller portion of the body as being provided with external screw threads adapted for connection with a nozzle having internal screw threads, it will be understood that an externally screw threaded nozzle may be attached to the body 3 either directly by engagement with the threads of the counter-bore 9, the plug 12 being removed during the filling operation, or by means of connecting fittings of any suitable known type of construction.

Obviously, my invention is susceptible of embodiment in forms other than that illustrated in the accompanying drawings, and I therefore consider as my own all modifications of the form of the device illustrated herein, which fairly fall within the scope of the appended claims.

I claim:—

1. A device of the character described comprising a body having an end portion adapted for connection with the inlet of a lubricant receptacle and being provided with a bore opening at one end through the said end portion of the body and being merged at its other end by an annular shoulder into a counter-bore extending longitudinally of the body for the remainder of the length thereof, said body having a duct opening through the shoulder at one end and communicating with the bore below the plane of the shoulder, and a ball valve adapted to seat in the bore at the juncture of the latter with the counter-bore, as and for the purpose set forth.

2. A device of the character described comprising a body having an end portion adapted for connection with the inlet of a lubricant receptacle and being provided with a bore opening at one end through the said end portion of the body and being merged at its other end by an annular shoulder into a counter-bore extending longitudinally of the body for the remainder of the length thereof, said body having a duct opening through the shoulder at one end and communicating with the bore below the plane of the shoulder, said shoulder being inclined downwardly toward its inner edge, and a ball valve adapted to seat in the bore at the juncture of the latter with the counter-bore, as and for the purpose set forth.

3. As an article of manufacture, an attachment for lubricant receptacles comprising a body adapted at one end for connection with the inlet of a receptacle and adapted at its other end for connection with a source of lubricant supply, said body having an axial bore opening through the first named end of the body and being merged intermediate of the length of the body into a counter-bore extending the remainder of the length of the body, thus defining an annular shoulder between the bore and the counter-bore, said body having a duct opening at one end through the shoulder and being in open communication at one side with said bore, a ball valve adapted to be disposed within the counter-bore and to close the inner end of the bore when in engagement with the latter, a closure for the outer end of the plug, said closure having an opening therethrough of a diameter to be closed by the ball valve when the latter is forced thereagainst.

4. As an article of manufacture, an attachment for lubricant receptacles comprising a body adapted at one end for connection with the inlet of a receptacle and adapted at its other end for connection with a source of lubricant supply, said body having an axial bore opening through the first named end of the body and being merged intermediate of the length of the body into a counter-bore extending the remainder of the length of the body, thus defining an annular shoulder between the bore and the counter-bore, said body having a plurality of spaced apart ducts extending part of the length of the bore in open communication at their sides with the latter and being formed to open at their inner ends through said shoulder, and a screw plug fitted into the outer end of said counter-bore and having a bore therethrough diametrically smaller than the ball valve and being enlarged at its inner end to provide a seat for the ball valve when the latter is forced thereagainst.

GEORGE A. PETTIT.